United States Patent [19]
Akimune

[11] Patent Number: 4,581,195
[45] Date of Patent: Apr. 8, 1986

[54] NEGATIVE HYDROGEN OR DEUTERIUM ION SOURCE USING SEMICONDUCTOR

[75] Inventor: Hideo Akimune, Kyoto, Japan

[73] Assignee: Kyoto University, Kyoto, Japan

[21] Appl. No.: 349,472

[22] Filed: Feb. 17, 1982

[30] Foreign Application Priority Data

Feb. 22, 1981 [JP] Japan ................................. 56-76697

[51] Int. Cl.$^4$ ............................................. H01J 27/02
[52] U.S. Cl. ................................... 376/129; 376/130; 250/423 R; 250/427; 315/111.81
[58] Field of Search ............... 376/106, 107, 127, 129, 376/130, 144, 145; 315/111.11, 111.31, 111.81, 111.91; 250/423 R, 427

[56] References Cited

U.S. PATENT DOCUMENTS

| | | | |
|---|---|---|---|
| 2,279,586 | 4/1942 | Bennett | 315/111.91 |
| 2,735,019 | 2/1956 | Dewan et al. | 376/129 |
| 3,336,475 | 8/1967 | Kilpatrick | 250/423 R |
| 4,298,798 | 11/1981 | Huffman | 376/129 |
| 4,335,465 | 6/1982 | Christiansen et al. | 376/129 |

FOREIGN PATENT DOCUMENTS 2257214  8/1975  France ........................... 315/111.81

Primary Examiner—Charles T. Jordan
Assistant Examiner—Richard Klein
Attorney, Agent, or Firm—Fleit, Jacobson, Cohn & Price

[57] ABSTRACT

The disclosed negative ion source uses a solid-state element having a semiconductor portion, which source includes a region adapted to dissociate molecules of hydrogen or deuterium in said solid-state element by dissolution, another region adapted to convert the atoms generated through the dissociation of said molecules into negative ions as said atoms reach the proximity of surface of said solid-state element through diffusion process by resonance transition of electrons in said solid-state element and to liberate the thus produced negative ions from said surface by hot electrons in said solid-state element, wherein the dissociation, electronic resonance transition, and liberation continuously occur in succession.

14 Claims, 6 Drawing Figures

NEGATIVE HYDROGEN OR DEUTERIUM ION SOURCE USING SEMICONDUCTOR

BACKGROUND OF THE INVENTION

1. Field of the Invention

This invention relates to a negative hydrogen or deuterium ion source, which negative ions play an important role in generation of large-capacity high-temperature plasma of a nuclear fusion reactor. More particularly, the invention relates to a source of negative hydrogen or deuterium ions which is adapted to produce a high-quality negative ion beam with a high electric current density by using a solid-state element including a semiconductor portion.

2. Description of the Prior Art

The neutral particle beam injection (NBI) is important in the research of nuclear fusion. Recent research in Japan and other countries has proved that, when a magnetic field holds a plasma, the neutral particle beam injection is an effective method of heating the plasma to a high temperature, or an effective method of generating such a hot plasma, without largely disturbing the holding ability of the magnetic field.

A conventional method of producing energetic neutral particle beams for injection into a plasma comprises steps of accelerating protons or deuterons so as to form beams, and neutralizing the proton or deuteron beams by the charge exchange collision in the gaseous target. Such conventional method of producing energetic neutral particle beams has shortcomings in that its neutralizing efficiency decreases with the increase of the energy of the protons or deuterons, so that, in the case of the deuteron energy in excess of 200 keV as required for actual thermonuclear fusion reactors, (1) the neutralizing efficiency becomes lower than 20%, (2) a very large evacuating capacity is required, and (3) the durability of the source to generate protons or deuterons becomes low.

To overcome the above-mentioned shortcomings of the conventional method of producing the energetic neutral particles by using protons or deuterons, a method of using negative ions is contemplated, in which negative ions are produced and accelerated and then neutralized by detachment of an excess electron. If it is intended to produce negative hydrogen ions $H^-$ or negative deuterium ions $D^-$ from hydrogen molecules $H_2$ or deuterium molecules $D_2$ through a conventional process, the yield of negative ion is not so large because the electron affinity of such molecules is as low as 0.7542 eV, and no effective method has been developed yet for producing such negative ions with a sufficiently high yield for practical application. More particularly, researchers are now studying two experimental negative ion producing methods; namely, an experimental method comprising steps of applying cesium (Cs), which has a low ionization potential, onto the metallic surface, creating protons or deuterons by gaseous discharge, and producing negative hydrogen or deuterium ions by using the two-electron capture reaction of the thus created protons or deuterons on the metallic surface; and another experimental method which produces negative hydrogen ions $H^-$ or negative deuterium ions $D^-$ by dissociating hydrogen molecules $H_2$ or deuterium molecules $D_2$ through electron impact or photoexcitation. The experimental methods of the prior art to produce negative ions have shortcomings in that the yield of negative ion is low, and that a comparatively large quantity of impurities such as cesium (Cs), electrons, and neutral gas are emitted from the negative ion source. Accordingly, there are a number of problems to be solved before establishing a practicable method of producing high-quality negative ion beam whose output is 10 to 50 A and large enough for carrying out the studies of nuclear fusion; such as elimination of impurities from the negative ion beam to be injected into the plasma, treatment of undesired electrons whose electric charge is of the same polarity as that of the desired negative ions, evacuation of a large amount of gas, and simplification of the intricate structure of the negative ion source.

SUMMARY OF THE INVENTION

Therefore, an object of the present invention is to obviate the aforesaid shortcomings and the problems of the prior art. To fulfill the object, the present invention provides a highly durable negative hydrogen or deuterium ion source of high efficiency type without necessitating any large capacity evacuating means, which negative ion source is particularly suitable for building an effective high-energy NBI device that is important in the research of nuclear fusion. The negative ion source of the present invention has the following features; namely, (1) Negative ion beams with a high current density can be generated.

(2) Negative ion beams with properties excellent from the viewpoint of ion-optics with which treats such quantities as the beam diversion and the brightness can be generated.

(3) Emission of neutral gas is minimized when the negative ion beams are generated.

(4) Formation of undesired electron flux is minimized when the negative ion beams are generated.

(5) Negative ion sources with an output current of 10 A class can be easily constructed.

More particularly, the negative ion source of the present invention is characterized in that negative hydrogen ions or negative deuterium ions are produced from hydrogen molecules or deuterium molecules by using a solid-state element including a semiconductor portion. The above-mentioned solid-state element has a region adapted to dissociate the molecules in the solid-state element by dissolution, a region adapted to generate the negative ions when the atoms caused by dissociation of the molecules reach the proximity of the solid-state element surface through the diffusion process by resonance transition of electrons in the solid-state element, and a region adapted to liberate the thus generated negative ions at the solid-state element surface by hot electrons in the solid-state element. In the negative ion source of the invention, the above-mentioned dissociation of the molecules and the generation and liberation of the negative ions occur continuously in succession.

In an embodiment of the invention, the solid-state element of the negative ion source is a composite member including a solid material portion highly permeable to hydrogen or deuterium and a semiconductor portion capable of efficiently producing hot electrons necessary for the electronic resonance transition. The solid material portion of the composite body can be made of vanadium (V) or palladium (Pd), while the semiconductor portion thereof can be made of silicon (Si).

In a preferred embodiment of the invention, the hot electrons for the above-mentioned resonance transition and the hot electrons necessary for the liberation at the solid-state element surface are generated by providing a p-n junction in the semiconductor portion and causing avalanche at the p-n junction through application of an inverse voltage thereto. A method of generating the negative hydrogen and deuterium ions is also disclosed herein.

Another object of the present invention is to provide negative ion source comprising a plurality of solid-state elements, in which each of the solid-state elements has a thin sheet of the above-mentioned solid material, the above-mentioned semiconductor including a p-n junction formed on the solid material sheet, and a metallic support rod with a substantially rectangular cross section and a recess formed along one side thereof, the thin sheet being airtightly sealed to the support rod so as to close the recess to define a gas chamber; an arcuate framework airtightly holding the solid-state elements in one or more arcuate rows; and a couple of slot-shaped electrodes disposed in front of the arcuate row of the solid-state elements held by the framework so as to focus negative ion beams from the solid-state elements. The gas chamber holds hydrogen or deuterium gas, while the slot-shaped electrodes focus the negative hydrogen or deuterium ion beams from the solid-state elements into one intense negative ion beam.

BRIEF DESCRIPTION OF THE DRAWINGS

For a better understanding of the invention, reference is made to the accompanying drawings, in which.

Throughout different views of the drawings, 1 is a solid-state element, 2 is a metallic support rod, 3 is a groove, 4 is a vanadium thin sheet, 5 is a silicon layer, 6 and 6' are metallic straps, 7 is a large hole, 8 is a small hole, 9 is a framework, and 10 and 11 are slot-shaped electrodes.

DETAILED DESCRIPTION OF THE PREFERRED EMBODIMENTS

The negative ion source of the present invention can be used for producing either negative hydrogen ions or negative deuterium ions. For simplicity of the description and for the ease of understanding of the invention, the following description will refer to a negative deuterium ion source in the main. However, it must be understood that similar description is also applicable to negative hydrogen ion source.

To generate negative deuterium ions $D^-$ from deuterium molecules $D_2$, the invention uses a solid-state element including a semiconductor portion so as to continuously carry out the following reaction processes in series in succession.

Figure 1:
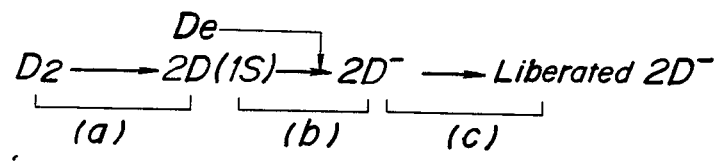
FIG. 1 is a schematic diagram of a negative hydrogen or deuterium ion source of the present invention, showing different steps of generating negative ions in the negative ion source.

More particularly, the reaction processes (a), (b), and (c) of FIG. 1 are effected continuously in succession. FIG. 1 shows the serial relationship of the reaction processes and a simplified overview of "coordination" in the solid-state element for producing the negative deuterium ions $D^-$. Deuterium $D_2$ gas of about one atm. (atmospheric pressure) is introduced to the left-hand side end of the serial processes of FIG. 1, while the right-hand side end thereof is kept at a high vacuum, so that the solid-state element acts as a partition therebetween as will be described hereinafter.

In the reaction process (a), the deuterium molecules $D_2$ in the deuterium gas of about one atm. thus introduced are dissociated into the solid-state element as atomic deuterium or deuteron through dissolution. The deuterium diffuses through the solid-state element as atomic deuterium or deuteron and reaches the proximity of the solid-state element surface as deuterium atom $D(1S)$ of ground state. In the next reaction process (b), the deuterium atoms $D(1S)$ of the ground state capture electrons e existing in the solid-state element by resonance transition of such electrons e on the solid-state element surface, whereby negative deuterium ions $D^-$ are produced. In the succeeding reaction process (c), the negative deuterium ions $D^-$ thus produced in the proximity of the solid-state element surface are liberated into the vacuum space from the solid-state element surface, so that the liberated negative deuterium ions $D^-$ are produced.

To ensure continuous effectuation of the reaction processes (a), (b), and (c), the solid-state element for producing the negative deuterium ions $D^-$ must meet various requirements; namely, to be able to dissolve and to diffuse a sufficiently large amount of deuterium therein by the deuterium dissociating reaction process and diffusion process (a) so as to ensure the generation of a negative deuterium ion beam with a sufficiently high current density for paractical application, to be able to pass the sufficient amount of particles flux from the left to the right as seen in FIG. 1, and to have a hollow space or a gas chamber on the high-pressure gas side of the solid-state element for receiving a sufficiently large amount of the deuterium gas. As can be seen from the foregoing, the solid-state element of the negative ion source of the present invention functions as a partition between the high-pressure gas area and the vacuum area, so that the solid-state element must have a sufficiently high mechanical strength to fulfil the function of the partition. Referring to the reaction process (b), the resonance transition of the electrons in the solid state element must be caused at an energy level corresponding to the electron affinity of the negative deuterium ion, and to this end, the so-called hot electrons must be produced in the solid-state element. If thermal excitation is effected to produce such hot electrons, thermionic emission from the surface of the solid-state element increases greatly. The electric charge polarity of the thus emitted electrons is the same as that of the negative deuterium ions liberated from the solid-state element in the above-mentioned reaction process (c). Accordingly, the production of hot electrons required for the resonance transition and for the liberation of negative ions must be effected not by the thermal excitation but by other suitable means.

To meet the aforesaid requirements for the solid-state element in the negative ion source of the present invention, a preferred embodiment of the invention uses a solid state element made of a composite body having a solid material portion and a semiconductor portion. The material of the solid material portion of the composite body is required to have a high permeability for deuterium so as to allow generation of a sufficiently large deuterium particle flux, and such material of the solid material portion portion is selected for instance from the group consisting of vanadium (V), niobium (Nb), palladium (Pd), and the like metals. The semiconductor of the semiconductor portion of the composite body is required to be able to generate hot electrons and is selected for instance from the group consisting of silicon (Si) and germanium (Ge). The composite body is preferably formed in such a shape that it fulfils the above-mentioned functions of the partition and the gas chamber incorporated therein. Theoretically, the material for the semiconductor portion in the composite body can be not only the silicon (Si) or germanium (Ge) but also any of semiconductors including compound semiconductors. Nonetheless, silicon is most preferable as the semiconductor of the composite body, because of its simple structure and high thermal stability.

To produce those hot electrons in the semiconductor portion of the composite body which are necessary for both the resonance transition to generate the negative ions and the liberation of the negative ions from the surface of the semiconductor, a preferred embodiment of the present invention forms a p-n junction in the semiconductor portion and applies an inverse voltage across the p-n junction so as to cause the so-called avalanche there. A part of the hot electrons generated by the avalanche pass through the thin n region and reach the proximity of the semiconductor surface so as to contribute to the production of the negative ions by resonance transition. The parameter of the p-n junction must be carefully selected as will be described hereinafter so that, when the avalanche occurs to generate the hot electrons, the density of the hot electrons is maintained at a level necessary for the resonance transition but the electron emission from the surface of the semiconductor due to the excessive energy surpassing the electron affinity of the semiconductor material is minimized. In short, the hot electrons must be generated in such a suitable manner that the desired resonance transition is ensured but the undesired electron emission is minimized. The hot electrons generated by the avalanche are in thermodynamic non-equilibrium and contribute to the liberation of the negative deuterium ions from the semiconductor surface by being temporarily trapped in the surface states of the semiconductor on the way of energy relaxation.

Figure 2A:
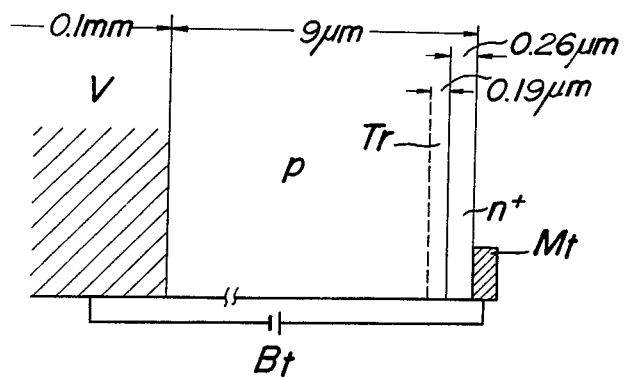
FIG. 2A is a schematic partial view of the essential portion of a solid-state element used in the negative ion source.
Figure 2B:
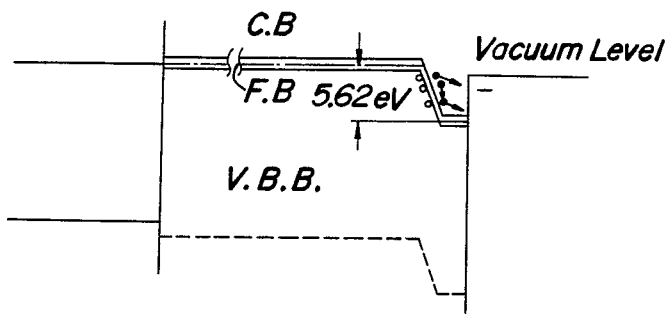
FIG. 2B is a diagrammatic illustration of profile of energy levels for electrons in the solid-state element of FIG. 2A.

FIG. 2A schematically shows the structure of an essential portion of the solid-state element necessary for the generation of the hot electrons, and FIG. 2B schematically shows the profile of the shows the profile of the energy levels for the electrons in the solid-state element of the above-mentioned structure. In the illustrated structure, a solid material reinforcing the solid-state element and concentrating the deuterium on one side of the semiconductor is, for instance, in the form of a vanadium thin sheet V of 0.1 mm thick, and the vanadium thin sheet V carries a semiconductor with a p-n junction formed thereon. The semiconductor on the vanadium thin sheet V is, for instance, 9 $\mu$m thick and includes a p-n junction with an n+ region of 0.26 $\mu$m and the remainder of p region. The metallic strap electrode Mt is formed on the n+ region. An inverse voltage is applied between the metallic strap electrodes Mt and the vanadium thin sheet V, for instance, by a battery power source Bt. The application of the inverse voltage establishes a depletion layer Tr of 0.19 $\mu$m thick mainly in P region, and deforms, a conduction band C.B., a forbidden band F.B., and a valence bond band V.B.B. as shown in FIG. 2B. A strong electric field arising in the depletion layer Tr accelerates electrons and holes, and causes the avalanche and at the same time generates the hot electrons. In the example of FIG. 2A and FIG. 2B, the parameter of the p-n junction is selected as follows, so as to ensure the generation of the hot electrons in the above-mentioned suitable manner; namely, Acceptor density $N_A$ in the p region: $N_A = 2.09 \times 10^{17}/cm^3$ Donor density $N_D$: $N_D = 2 \times 10^{18}/cm^3$ Operating temperature T: T = 150° C.

It is assumed that the spatial distribution of the acceptor and donor densities $N_A$ and $N_D$ vary stepwise at the p-n junction.

Figure 3A:
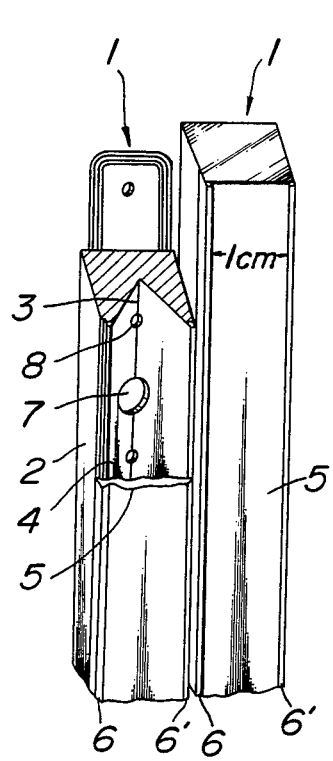
FIG. 3A is a partially cutaway perspective view of a practical example of the solid-state element to be incorporated in the negative ion source of the invention.
Figure 3B:
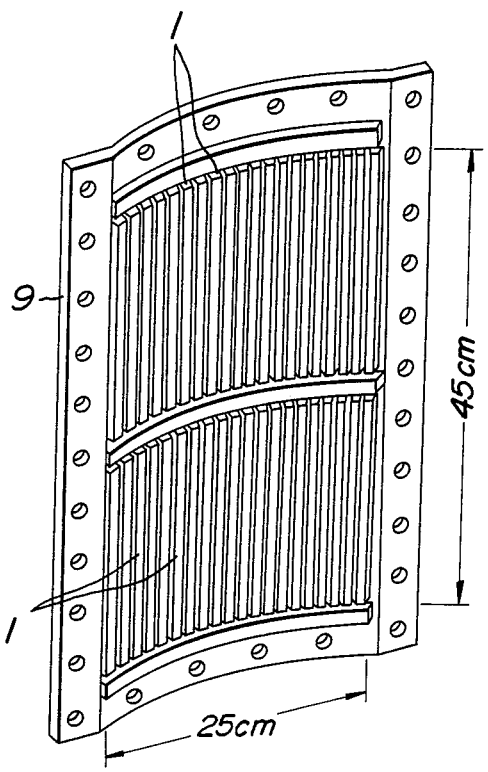
FIG. 3B is a perspective view of a framework carrying a plurality of the solid-state elements.

FIG. 3A shows two juxtaposed solid-state elements of the above-mentioned construction according to the present invention; one solid-state element shown in a perspective view of overall appearance thereof and the other solid-state element shown in a partially cutaway perspective view to illustrate the inside structure thereof. A number of the illustrated solid-state elements can be assembled so as to form negative ion source capable of producing negative ion beam with an output current of 20 A class. FIG. 3B shows a perspective view of a framework to be used in the negative deuterium ion source of the present invention to hold a plurality of the above-mentioned solid-state elements for instance in two arcuate rows.

The illustrated solid-state element 1 has a metallic support rod 2 with a substantially rectangular cross section. The support rod 2 is disposed on that side of the solid-state element 1 where the comparatively high pressure gas is introduced as shown in the left-hand side end of FIG. 1. The rectangular support rod 2 has a groove 3 whose cross section is for instance triangular, which groove 3 is formed on the side opposite to that where the comparatively high pressure gas is introduced, as shown in the figure. Small holes 8 are bored from the bottom portion of the groove 3 to the opposite non-grooved surface of the support rod 2, so that the support rod 2 can be secured to a framework 9 of the negative ion source by inserting a securing means such as setscrews (not shown) through the small holes 8. Similarly, large holes 7 are bored through the support rod 2 substantially in parallel to the small holes 8, so as to facilitate the introduction of the comparatively high pressure deuterium gas from the outside to the triangular groove 3, whereby the groove 3 is used as a reservoir or gas chamber of the comparatively high pressure deuterium gas.

The open side of the groove 3, or that side of the rectangular support rod 2 which is opposite to the side receiving the comparatively high pressure gas shown at the left-hand side end of FIG. 1, is airtightly closed for instance by the above-mentioned 0.1 mm thick vanadium thin sheet 4 by welding or the like. The vanadium thin sheet 4 defines a partition between the comparatively high pressure deuterium gas area and the vacuum area. A p-type silicon layer 5 of for instance 9 μm thickness is deposited on the vanadium thin sheet 4 by a suitable conventional depositing method. When the p-type silicon layer 5 is deposited, a thin layer of binary alloys (V3Si, V5Si3, VSi2) is formed between the vanadium thin sheet 4 and the p-type silicon layer 5 for instance by contact reaction at a high temperature of about 750° C., so as to ensure secure bondage between the vanadium thin sheet 4 and the silicon layer 5 and to prevent the silicon layer 5 from peeling away from the vanadium thin sheet 4. A suitable crystallizing treatment is applied to the p-type silicon layer 5, and a five-valence impurity such as phosphorous (P) is diffused into a thin layer in the proximity of the surface of the crystallized p-type silicon layer 5. Whereby, the above-mentioned n+ layer of for instance 0.26 μm thickness is formed on vacuum side surface of the 9 μm thick silicon layer 5. A pair of metallic straps 6 and 6' are deposited on the surface of the n+ silicon layer along the opposite edges thereof, so as to provide the metallic electrodes Mt of FIG. 2A for application of the inverse voltage to cause the avalanche. When the inverse voltage is applied between the vanadium thin sheet 4 and a pair of metallic straps 6, 6', a depletion layer of for instance 0.19 μm thickness is formed mainly in the p-type base portion.

Referring to FIG. 3B, a plurality of the solid-state elements 1 shown in FIG. 3A are airtightly secured to an arcuate framework 9 with packings (not shown) inserted therebetween. That portion of the framework 9 which carries the solid-state elements 1 is curved with a radius of curvature necessary for focussing the negative deuterium ion beams from the individual solid-state elements 1. In the illustrated embodiment, the solid-state elements 1 are arranged in two arcuate rows and secured to the framework 9 by using the small holes 8 bored at the bottom of the triangular groove 3 of each solid-state element 1.

Figure 3C:
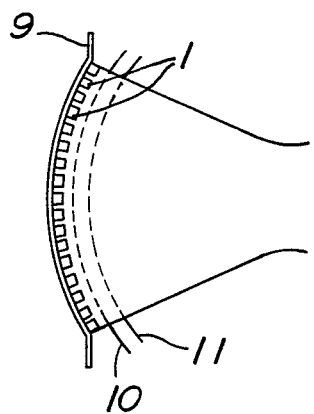
FIG. 3C is a schematic overall top view of the negative ion source of the invention, showing the relationship between the solid-state elements and a couple of slot-shaped electrodes to focus the negative ion beams from the solid-state elements.

As shown in FIG. 3C, a slot-shaped electrode 10 with two parallel plates is disposed in front of the vacuum side surfaces of the solid-state elements 1 so as to face the negative deuterium ion emitting surfaces of all the solid-state elements 1. Another slot-shaped electrode 11 which has almost same form as the above-mentioned slot-shaped electrode 10 is disposed on the downstream side so as to be parallel to the slot-shaped electrode 10 with a small gap. Accordingly, when a negative high voltage with respect to the slot-shaped electrode 11 is applied to the solid-state elements 1, and when a relatively low positive voltage with respect to the slot-shaped electrode 11 is applied to the slot-shaped electrode 10, the negative deuterium ion beams from the solid-state elements 1 are focussed by both slot-shaped electrode 10 and 11 into an intense negative ion beam.

The operation of the negative deuterium ion source of the above-memtioned construction will be described now. Deuterium gas of comparatively high pressure is applied to the solid-state elements 1 as mounted on the framework 9, while the temperature of the solid-state elements 1 is controlled at the operating level thereof, e.g., at 150° C. The space between the solid-state elements 1 and the slot-shaped electrodes 10 and 11 is made vacuous. The inverse voltage is applied across the vanadium thin sheet 4 and the metallic straps 6 and 6', so as to cause the avalanche at the p-n junction, so that the negative deuterium ions D− are generated and liberated from the vacuum side surfaces of the solid-state elements 1. As a suitable negative potential relative to that of the slot-shaped electrode 11 is applied to the solid-state elements 1 and a low positive potential with respect to that of the slot-shaped electrode 11 is applied to the slot-shaped electrode 10, the thus liberated deuterium anions D− are focussed into an intense negative deuterium ion beam which is extracted to the outside of the negative ion source. The nature of the negative deuterium ion beam thus extracted can be controlled for instance by suitably selecting the radius of curvature of the framework 9 carrying the solid-state elements 1, the structure of the slot-shaped electrodes 10 and 11 for extracting the negative deuterium ion beam, the gap between the vacuum side surface of the solid-state elements 1 and the slot-shaped electrode 10, the gap between the slot-shaped electrodes 10 and 11, and the potentials of the solid-state elements 1 and the slot-shaped electrode 10 with respect to the slot-shaped electrode 11.

In the negative ion source of the present invention, the negative deuterium ions D− are liberated from the solid surfaces of the solid-state elements 1 and the thermal movement of the liberated deuterium anions D− is not so large as can be seen from the foregoing description, so that a very high quality negative ion beam with a high current density and yet substantially free from impurities can be provided.

More specifically, the solid-state element to be used in the negative ion source of the present invention can produce a beam of negative deuterium ions D− with a current density of about 27 mA/cm² in the vicinity of the solid-state element surface, based on an approximate calculation in which the following factors are counted; namely, the transition rate of electrons at the semiconductor surface of the solid-state element, the electron number density necessary for the resonance transition of electrons at the semiconductor surface, the potential energy due to the interaction of the semiconductor surface with both the deuterium atom D(1S) of ground state formed by dissociation of the introduced deuterium molecules and the negative deuterium ion D−(1S1S'), the deuterium particle flux passing through the solid-state element for producing the negative deuterium ions, and survival probability of the negative deuterium ions. If necessary, high-quality negative ion beams of 10 A class can be easily obtained by using a negative ion source having a practicable number of the solid-state elements of the above-mentioned structure and dimensions disposed on the framework thereof. Besides, the particle flux of the undesired atoms emitted at the time of liberating such a negative ion beam with a high current can be suppressed down to about 18.5% of the negative ions. Thus, the negative ion source of the present invention has excellent performance and characteristics.

As described in the foregoing, the present invention provides a negative ion source which has excellent performance and can produce high-quality negative hydrogen or deuterium ion beams with a high current density. Furthermore, if a negative deuterium ion source with an output current of 20 A class is built by using the present invention for application to an NBI device with a deuterium energy of 150 keV, the evacuating capacity of the thus built negative ion source will be about 0.34 Torr.l/sec, which evacuating capacity is roughly one-thirtieth of that required for conventional neutral particle producing methods by accelerating and then neutralizing positive ions. The negative deuterium ion beam can be neutralized by the photodetachment of an excess electron with application of the laser or the like. When such neutralization is applied to the negative ion beams generated by the negative ion source of the present invention, about 95% of neutralizing efficiency can be expected in the case of negative deuterium ions in a high energy range of 200 keV or higher. Accordingly, as compared with the prior art, considerable reduction can be expected in the power source load for ion beam acceleration and in the thermal load of a target for non-neutralized ions. Besides, since no gas cell is required, the present invention allows deflection of ion beams by electric or magnetic fields before neutralization thereof, whereby the ion source of the present invention can be disposed at any suitable position free from the irradiation of neutrons emerging from the core of a nuclear fusion reactor. Thus, the present invention drastically reduces the adverse effects of radiation on the ion source, as compared with the prior art.

Although the invention has been described with a certain degree of particularity, it is understood that the present disclosure has been made only by way of example and that numerous changes in details of construction and the combination and arrangement of parts may be resorted without departing from the scope of the invention as hereinafter claimed.

What is claimed is:

1. A method of generating negative ions comprising the steps of:
   providing for a solid-state element;
   dissociating hydrogen or deuterium molecules in one region at one end of said solid-state element by dissolution;
   generating a plurality of electrons in another region of said solid-state element;
   providing for the resonance transition by said plurality of electrons in said solid-state element in said another region in the proximity of the opposite end of said solid-state element;
   diffusing the dissociated hydrogen or deuterium through said solid-state element from said one region to said another region;
   generating negative ions when said dissociated hydrogen or deuterium reaches said proximity of said opposite end by the resonance transition of said hot electrons;
   liberating said negative ions from said opposite end of said solid-state element by said hot electrons; and wherein
   said dissociating, said generating and said liberating occurs in continuous succession.

2. A method as claimed in claim 1 wherein
   a semiconductor portion is provided for in said solid-state element; and
   providing an avalanche in said semiconductor portion to produce said hot electrons.

3. A device having one end thereof adapted to receive hydrogen or deuterium molecules and the other end thereof adapted to liberate negative hydrogen or deuterium ions comprising:
   a solid-state element adapted to receive hydrogen or deuterium molecules at one region of said solid-state element located at said one end of the device, said one region including means for dissociating the hydrogen or deuterium molecules in the solid-state element by dissolution;
   a semiconductor layer portion provided at the other end of said solid-state element and having a p-n junction formed in said semiconductor portion, said semiconductor layer portion further having a surface adapted to emit negative ions therefrom in close proximity to said p-n junction;
   a voltage source means for providing a plurality of electrons, said voltage source means connected at least across said p-n junction; and
   means for obtaining the resonance transition by said plurality of electrons in said solid-state element at an energy level corresponding to the electron affinity of the negative hydrogen or negative deuterium ion, said means for obtaining the resonance transition being located in another region in the proximity of said other end and being part of said semiconductor portion.

4. A device as claimed in claim 3 including:
   means for diffusing said dissociated hydrogen or deuterium through said solid-state device from said one region to said means for obtaining resonance transition in said another region in the proximity of said other end such that negative ions are produced in said another region and are liberated from said other end.

5. A device as claimed in claims 3 or 4 wherein a portion of said plurality of electrons are hot electrons.

6. A device as claimed in claim 5 wherein said solid-state element is a composite body having a solid material portion with a high permeability with respect to said hydrogen or deuterium molecules and said semiconductor portion is capable of efficiently producing said hot electrons necessary for said resonance transition of electrons.

7. A device as claimed in claim 6 wherein said solid material portion is made of a material selected from the group consisting of vanadium, niobium, and palladium, and said semiconductor portion is made of a material selected from the group consisting of silicon, germanium, and compound semiconductors.

8. A device as claimed in claim 6 wherein said voltage source means is an inverse voltage source connected across said p-n junction so as to selectively cause an avalanche at the p-n junction upon application of an inverse voltage thereto, whereby the hot electrons for said resonance transition and the hot electrons for said liberation at the solid-state element surface are generated by said avalanche.

9. A device as claimed in claim 6 including a framework airtightly holding a plurality of said solid-state elements in an arcuate row, and slot-shaped electrodes disposed close to the negative ion emitting surface of the solid-state elements; each of said solid-state elements being a thin sheet of said solid material portion with a p-n junction of said semiconductor portion formed thereon, and a metallic support rod with a substantially rectangular cross section and a recess formed along one side of said rod, said thin sheet being airtightly sealed to said support rod so as to close said recess to define a reservoir for said hydrogen or deuterium molecules in a gaseous state, whereby the liberated negative ions from said solid-state elements are focused into one negative ion beam by said slot-shaped electrodes.

10. A negative ion source utilizing a semiconductor comprising:
   a solid-state element made of a composite body having a solid material portion being highly permeable with respect to deuterium or hydrogen molecules and a semiconductor portion adapted to produce hot electrons necessary for the resonance transition of electrons;

said semiconductor portion having a p-n junction formed therein and said semiconductor portion having a surface adapted to emit negative ions therefrom in close proximity to said p-n junction;

an inverse voltage source providing a plurality of electrons connected across said p-n junction so as to selectively cause an avalanche at the p-n junction upon application of an inverse voltage thereto;

a framework airtightly holding a plurality of said solid-state elements in an arcuate row, and a slot-shaped electrode disposed close to the negative ion emitting surface of the solid-state elements so as to focus the emitted ions into one negative ion beam by said slot-shaped electrode;

a high-pressure deuterium or hydrogen molecular gas source airtightly connected to one side of said framework and a vacuum chamber connected to another side of said framework, said ion emitting surface located at one of said solid-state element and said slot-shaped electrode both being disposed within said vacuum chamber;

whereby deuterium or hydrogen molecules received from said molecular source dissociate into said solid material portion by dissolution, the dissociated deuterium or hydrogen molecules produce negative ions when said dissociated deuterium or hydrogen diffuse into the region proximate said p-n junction due to the resonance transition of hot electrons, and said negative ions are liberated from said ion emitting surface by said hot electrons, said dissociation of the molecules, said generation and said liberation of negative ions occurring continuously in succession.

11. A negative ion source as set forth in claim 18, wherein said solid material portion is made of a material selected from the group consisting of vanadium, niobium and palladium, and said semiconductor portion is made of a material selected from the group consisting of silicon, germanium and compound semiconductors.

12. A negative ion source as set forth in claim 10, wherein said p-n junction includes a p-region for receiving deuterium or hydrogen molecules and dissociating those molecules into said p-n junction of said solid-state element so as to generate atomic deuterium or hydrogen through dissolution and diffusion; a depletion layer for generating negative deuterium or hydrogen ions by capturing electrons existing in the solid-state element due to the resonance transition of said hot electrons proximate the solid-state element surface; and n+ region for liberating the negative deuterium or hydrogen ions into the vacuum chamber with the aid of the inverse voltage source applied to both sides of p-n junction selectively causing said avalanche therein.

13. A negative ion source as set forth in claim 10, wherein each of said solid-state elements is a thin sheet of said solid material portion with a p-n junction of said semiconductor portion formed thereon; and includes a metallic support rod with a substantially rectangular cross section with a recess formed along one side of said rod, said thin sheet being airtightly sealed to said support rod so as to close said recess to define a reservoir for said deuterium molecules in gas state, whereby the liberated negative ions from said solid-state elements are focused into one negative ion beam by said slot-shaped electrode.

14. A negative ion source as set forth in claim 10, wherein said inverse voltage source is connected across said p-n junction so as to selectively cause avalanche at the p-n junction upon application of an inverse voltage thereto, whereby said hot electrons for said resonance transition and said hot electrons for said liberation at the solid-state element surface are generated by said avalanche.

* * * * *